(12) United States Patent
Shen et al.

(10) Patent No.: US 10,228,287 B2
(45) Date of Patent: Mar. 12, 2019

(54) MEASURING POLARISATION VIA A GATING FREQUENCY

(71) Applicant: University of Salford Enterprises Limited, Salford (GB)

(72) Inventors: Tiehan Shen, Leeds (GB); Paul Joseph Cook, Edenbridge (GB)

(73) Assignee: University of Salford Enterprises Limited, Salford, Greater Manchester (GB)

( * ) Notice: Subject to any disclaimer, the term of this patent is extended or adjusted under 35 U.S.C. 154(b) by 128 days.

(21) Appl. No.: 15/321,148

(22) PCT Filed: Jun. 26, 2015

(86) PCT No.: PCT/GB2015/051862
§ 371 (c)(1),
(2) Date: Dec. 21, 2016

(87) PCT Pub. No.: WO2015/198061
PCT Pub. Date: Dec. 30, 2015

(65) Prior Publication Data
US 2018/0058934 A1  Mar. 1, 2018

(30) Foreign Application Priority Data

Jun. 27, 2014 (GB) .................................. 1411478.9

(51) Int. Cl.
*G01J 4/04* (2006.01)
*G02F 1/01* (2006.01)
*G01J 4/00* (2006.01)

(52) U.S. Cl.
CPC .............. *G01J 4/04* (2013.01); *G02F 1/0126* (2013.01); *G02F 1/0136* (2013.01); *G01J 2004/004* (2013.01)

(58) Field of Classification Search
CPC ............ G02B 5/30; G02B 5/3025; G02F 1/00; G02F 1/0063; G02F 1/0072; G02F 1/01;
(Continued)

(56) References Cited

U.S. PATENT DOCUMENTS 6,664,528 B1 * 12/2003 Cartlidge ............... G02B 27/58
250/208.1
7,663,752 B2 * 2/2010 Otsuki ................. G01N 21/211
250/225

(Continued)

FOREIGN PATENT DOCUMENTS

EP          0827908           3/1998
WO       WO-2010005874       1/2010
(Continued)

OTHER PUBLICATIONS

"International Application No. PCT/GB2015/051862, International Search Report and Written Opinion dated Dec. 10, 2015", (Dec. 10, 2015), 15 pgs.
(Continued)

*Primary Examiner* — Gordon J Stock, Jr.
(74) *Attorney, Agent, or Firm* — Schwegman Lundberg & Woessner, P.A.

(57) ABSTRACT

A method and apparatus are disclosed for measuring polarization of electromagnetic illumination. The method includes the steps of modulating a polarization state of illumination received from a target object to generate modulated intensity illumination, selectively measuring an intensity of the modulated intensity illumination by periodically gating an exposure of an imaging device to the modulated intensity illumination at a first gating frequency; responsive to the measured intensity, determining polarization parameters of the received illumination, and generating image data corresponding to the target object with a plurality of the polarization parameters, wherein the illumination from the
(Continued)

target object is modulated in accordance with a first frequency and the first gating frequency is associated with and synchronized with at least the first frequency.

15 Claims, 8 Drawing Sheets

(58) Field of Classification Search
CPC .... G02F 1/0121; G02F 1/0128; G02F 1/0131; G02F 1/0136; G02F 1/11; G02F 1/113; G02F 1/133528; G01J 4/00; G01J 4/02; G01J 4/04; G01J 2004/001; G01J 2004/002; G01J 2004/004; G01J 2004/005; G01J 2004/007; G01J 2004/008; G01N 21/21; G01N 21/211; G01N 21/23; G01N 2021/212; G01N 2021/213; G01N 2021/214; G01N 2021/215; G01N 2021/216; G01N 2021/217; G01N 2021/218
See application file for complete search history.

(56) References Cited

U.S. PATENT DOCUMENTS

| | | | |
|---|---|---|---|
| 2003/0058442 A1* | 3/2003 | Garab | G01N 21/21 356/369 |
| 2005/0134687 A1 | 6/2005 | Kaminsky et al. | |
| 2005/0134849 A1* | 6/2005 | Beaglehole | G01N 21/211 356/369 |
| 2010/0103417 A1* | 4/2010 | Otani | G01N 21/21 356/364 |
| 2016/0116397 A1* | 4/2016 | Freudenthal | G01N 21/23 356/370 |

FOREIGN PATENT DOCUMENTS

| | | |
|---|---|---|
| WO | WO-2013138090 | 9/2013 |
| WO | WO-2015198061 | 12/2015 |

OTHER PUBLICATIONS

Ramelli, Renzo, et al., "ZIMPOL-3: A powerful solar polarimeter", Proceedings of SPIE, vol. 7735 (Jul. 13, 2010), (Jul. 13, 2010), 12 pgs.

"International Application No. PCT/GB2015/051862, International Preliminary Report on Patentability dated Dec. 27, 2016", (Dec. 27, 2016), 11 pgs.

"Polarisation prototype for most accurate, non-invasive imaging of cells yet", News article published by University of Salford, United Kingdom, Jul. 2, 2012 [http://www.salford.ac.uk/news1/polarisationprototype-for-most-accurate,-non-invasive-imaging-of-cells-yet], (Jul. 2, 2017), 1 pg.

Guan, Wei, "Experimental determination of the Stokes parameters using a dual photoelastic modulator system", Applied Optics / vol. 49, No. 14 / May 10, 2010, (May 10, 2010), 2644-2652.

Guan, Wei, et al., "The measurement of the Stokes parameters: A generalized methodology using a dual photoelastic modulator system", Journal of Applied Physics 103, 043104-1 to 043104-6; s2008d, (Feb. 26, 2008), 043104-1-043104-6.

Stenflo, J. O., "Solar polarirnetry with ZIMPOL", Mem. S.A.It. vol. 78, 181-190 (2007), (2007), 181-190.

* cited by examiner

MEASURING POLARISATION VIA A GATING FREQUENCY

PRIORITY CLAIM TO RELATED APPLICATIONS

This application is a U.S. national stage application filed under 35 U.S.C. § 371 from International Application Serial No. PCT/GB205/051862, which was filed 26 Jun. 2015, and published as WO2015/198061 on 30 Dec. 2015, and which claims priority to United Kingdom Application No. GB 1411478.9, filed 27 Jun. 2014, the benefit of priority of each of which is claimed herein.

TECHNICAL FIELD

The present invention relates to methods and apparatus for measuring the polarisation of electromagnetic radiation. In particular, but not exclusively, the invention relates to the provision of image data corresponding to a target object by measuring intensity of illumination and modulating the illumination in a coordinated fashion.

BACKGROUND

Polarimeters are devices used to measure the polarisation state of electromagnetic waves (i.e. electromagnetic illumination) and are used in various fields such as organic and biological microscopy, crystallography and astronomy.

Many polarimeters work by passing electromagnetic rays of unknown, or partially unknown polarisation state through an optical assembly the polarisation co-ordinate system of which is known. That is, the optical assembly imparts a known change in the polarisation state of electromagnetic rays that pass through it. Then, by providing a detector that measures changes in the properties of the electromagnetic rays after they have passed through the optical assembly, information about the original polarisation state of the electromagnetic rays can be calculated.

In many polarimeters, the optical assembly comprises one or more polarisation modulators. Polarisation modulators are devices the optical properties of which vary in response to the application of modulating stimuli. Electromagnetic rays that pass through a polarisation modulator are subject to a change in polarisation state that varies in accordance with the applied modulating stimuli. Polarisation modulators can be arranged so that output electromagnetic rays that have undergone modulation, vary in intensity in correspondence with the imparted polarisation changes. This variance in intensity can be readily detected by a photo-detector. As is known, by analysing the variances in the intensity of the modulated electromagnetic rays information about the polarisation state of the light can be determined.

Advanced polarimeters often employ optical phase modulators for modulating the polarisation of light. Optical phase modulators, such as photoeleastic modulators (PEMs), are often preferred because they have superior optical and modulating properties. However, such modulators typically operate at very high modulation frequencies (in the order of tens of kHz) which means that the detectors in systems including such modulators must be capable of operating at such frequencies.

This is a particular problem for imaging polarimeters. Imaging polarimeters are arranged to measure polarisation parameters of electromagnetic rays reflected, emitted or transmitted by an object (or scene) with a degree of spatial resolution. Such devices typically employ a two-dimensional photo-detector array. However, commonplace imaging devices such as digital cameras cannot operate at frame rates that are as high as typical optical phase modulator modulating frequencies. Accordingly, for imaging polarimeters at least, complex custom sensors are typically required which can be difficult to integrate into existing systems and are generally much more expensive than "off-the-shelf" digital camera type devices.

Modification of existing digital camera devices may be possible but would typically result in reduced polarimeter performance. For example, it may be possible to increase the frame rate of digital camera type devices by replacing alternate rows of detector pixels with storage devices. However, this reduces the number of working detector pixels and correspondingly the resolution of the device.

It is desirable to provide a polarimeter that can use a conventional photo detector array as a sensor. It would be particularly desirable to provide an imaging polarimeter that can use a conventional two dimensional photo detector array as a sensor.

SUMMARY OF THE INVENTION

According to a first aspect of the present invention there is provided a method for measuring polarisation of electromagnetic illumination, comprising:
  modulating a polarisation state of illumination received from a target object to generate modulated intensity illumination;
  selectively measuring an intensity of the modulated intensity illumination by periodically gating an exposure of an imaging device to the modulated intensity illumination at a first gating frequency;
  responsive to the measured intensity, determining polarisation parameters of the received illumination, and
  generating image data corresponding to the target object with a plurality of the polarisation parameters, wherein the illumination from the target object is modulated in accordance with a first frequency and the first gating frequency is associated with and synchronised with at least the first frequency.

Aptly, a technique is provided in which the exposure of the imaging device of a polarimeter detector is gated at a gating frequency. That is, in contrast to conventional arrangements, a gating mechanism is provided that acts as a "shutter" which exposes the imaging device at a gating frequency (or gating frequencies) corresponding to, and in synchronisation with, the modulation frequency (or modulation frequencies) of the polarising modulation. The intensity of the modulated electromagnetic illumination can be readily determined by averaging the total intensity measured during the exposure period by the number of individual gating periods during the exposure period. Accordingly, conventional low cost devices, such as CCD arrays commonly found in digital cameras, can be used in the polarimeter detector irrespective of low frame rate. Such low cost devices are readily available, easy to incorporate into laboratory equipment and are inexpensive compared to custom two-dimensional sensors. By adopting this technique, less costly and less complex detectors can be used in advanced polarimeters.

Optionally, prior to performing the modulating step, the illumination passes through an infinity corrected optical element.

In imaging polarimeters, different light rays experience different amounts of polarising modulation. This is because the optical geometry of the modulator is typically such that it is inevitable that different light rays travel different distances through the modulator therefore undergo different levels of modulation (e.g. phase retardance). More specifically, each light ray is associated with a different "K matrix" (explained in more detail below).

Unless a target object is at an optically infinite distance, in conventional wide field optical systems light incident on a particular part of an imaging device (e.g. on a specific pixel of a photo detector) will have travelled via multiple optical paths (due to the divergent nature of light). Accordingly, if conventional wide field techniques are employed in a polarimeter, light incident on a specific part of the imaging device will pass through multiple optical paths and therefore undergo multiple different amounts of polarising modulation. This makes measuring the polarisation state of light received at a specific point on the imaging device (i.e. at a particular pixel), and therefore imaging polarimetery in general, complex because the optical properties of multiple different paths must be taken into account. This is particularly relevant during polarimeter calibration.

In accordance with this optional step, if, prior to the modulation step, the received illumination passes through an infinity corrected optical element (e.g. an infinity corrected lens), then rays of the light incident on a particular part of the imaging device (e.g. on a specific pixel), will travel along specific optical paths and only undergo polarising modulation associated with those optical paths. Thus, each individual pixel can be readily calibrated using established calibration techniques to take account of the optical properties (e.g. polarising effects) of the specific (parallel) optical paths taken by light incident on that pixel. Moreover, each part (e.g. pixel) of the imaging device of the detector can be treated as an individual integrator for a particular point on the target object.

Optionally, the method further comprises prior to determining the polarisation parameters of the received illumination, calibrating to accommodate for polarising effects associated with different optical paths taken by the received illumination after being received and before being selectively measured. In some examples determining the calibration data comprises passing illumination from a patterned target object of known optical properties through a calibration optical element of known optical properties after being passed through the infinity corrected lens and before being modulated.

Optionally, periodically gating the exposure of the imaging device to the modulated intensity illumination comprises intensifying an image incident on the imaging device using an image intensifier operating at the gating frequency. In accordance with this optional feature, an image intensifier can be used to periodically amplify the level of light incident on the imaging device. This can be configured so that during periods where the image intensifier is not on (i.e. not amplifying the light), the level of light incident on the imaging device is effectively zero. Image intensifiers can be readily integrated into imaging devices and can be controlled at high frequencies. Accordingly, they provide a convenient means to provide the gating mechanism.

Optionally, periodically gating the exposure of the imaging device to the modulated intensity illumination comprises periodically illuminating the target object at the gating frequency. If the target object is in a darkened or suitably illuminated environment, in periods during which the target object is not illuminated, the amount of light incident on the imaging device is effectively zero (i.e. as if it has been shuttered). Gating exposure of the imaging device by periodically illuminating target object means that a gating mechanism can be provided that does not require any substantial internal modification to the polarimeter as the illumination can be provided by an external element.

Optionally, after modulating the polarisation state of the received illumination and before selectively measuring the intensity of the modulated intensity illumination, the modulated intensity illumination is split to produce a least one further beam of modulated intensity illumination. Accordingly, multi-channel implementations can be provided that provide multiple detection paths. In this way, multiple versions of the image data can be collected simultaneously. Many implementations require several frames of image data to be processed before all the polarisation parameters can be determined. By providing multiple detection paths more than one frame of image data can be captured during a single exposure period. This enables a faster determination of the polarisation parameters. Further, as the technique enables the use of conventional, low cost imaging devices, the cost and complexity of multi-channel implementations is reduced.

Optionally, if the modulated intensity illumination is split, the method further comprises selectively measuring an intensity of the further beam of modulated intensity illumination by periodically gating an exposure of a further imaging device to the further beam of modulated intensity illumination at a further gating frequency; responsive to the measured intensity of the further beam of modulated intensity illumination, determining further polarisation parameters of the received illumination, and generating further image data corresponding to the target object with a plurality of the further polarisation parameters. The further gating frequency is associated with and synchronised with at least the first frequency. Further, optionally, the first gating frequency and the further gating frequency are substantially 180 degrees out of phase.

Optionally, selectively measuring the intensity of the modulated intensity illumination comprises periodically measuring the modulated intensity illumination for a predetermined proportion of a cycle time of the modulated intensity illumination. Further, optionally, the predetermined proportion is associated with a 50% duty cycle of the first frequency.

Optionally, modulating the polarisation state is via at least one first photoelastic modulator. Further, optionally, the first frequency is a resonant frequency of the first photoelastic modulator.

Optionally, the method comprises modulating the polarisation state of the received illumination by the first photoelastic modulator and then further modulating the polarisation state of the received illumination by a second photoelastic modulator. Further, optionally, the method comprises modulating the polarisation state of the received illumination by the second photoelastic modulator at a second frequency. The second frequency is a resonant frequency of the second photoelastic modulator.

Optionally, the modulated intensity illumination is selectively measured at the first gating frequency and a second gating frequency. The second gating frequency corresponds to the resonant frequency of the second photoelastic modulator.

Optionally, the modulating further comprises passing the illumination through a linear polariser.

Optionally, the imaging device is a photo detector array.

Optionally, the polarisation parameters are Stokes parameters. Further, optionally, the polarisation parameters are all of I, Q, U and V Stokes parameters.

Optionally, determining the polarisation parameters of the received illumination comprises extracting from the selectively measured intensity of the modulated intensity illumination, one or more coefficients of a complex waveform associated with the modulated intensity illumination. Further, optionally, the method further comprises using the one or more coefficients to solve a Mueller matrix to determine the Stokes parameters.

In accordance with a second aspect of the invention there is provided an apparatus for measuring polarisation of electromagnetic illumination. The apparatus comprises: a modulator operable to modulate a polarisation state of illumination received from a target object and to generate modulated intensity illumination; a detector and a gating unit, said gating unit operable to periodically gate an exposure of an imaging device of the detector to the modulated intensity illumination at a first gating frequency, thereby enabling the detector to selectively measure an intensity of the modulated intensity illumination, and a processor operable to determine, from the selective measurement of the intensity of the modulated intensity illumination, polarisation parameters of the received illumination and to generate image data corresponding to the target object with a plurality of the polarisation parameters. The modulator modulates the received illumination in accordance with a first frequency and the first gating frequency is associated with and synchronised with at least the first frequency.

Optionally, the apparatus further comprises an infinity corrected optical element disposed such that illumination passes through the infinity corrected optical element before passing through the modulator.

Optionally, the processor is provided with calibration data associated with polarising effects of different optical paths taken by the received illumination before being selectively measured by the detector.

Optionally, the gating unit is an image intensifier operable to intensify, at the first gating frequency, an image incident at the imaging device. Alternatively, the gating unit is an illumination unit operable to periodically illuminate the target object at the first gating frequency.

Optionally, the apparatus further comprises a beam splitter disposed after the modulator. The beam splitter is operable to split the modulated intensity illumination into a further beam of modulated intensity illumination.

Optionally, if the apparatus includes the beam splitter, the apparatus further comprises: a further detector and a further gating unit. The further gating unit is operable to periodically gate an exposure of an imaging device of the further detector to the further beam of modulated intensity illumination at a further gating frequency. This enables the further detector to selectively measure an intensity of the modulated intensity illumination. The processor is operable to determine, from the selective measurement of the intensity of the further modulated intensity illumination, further polarisation parameters of the received illumination and to generate further image data corresponding to the target object with a plurality of the polarisation parameters. The further gating frequency is associated with and synchronised with the first frequency.

Optionally, the first gating frequency and the further gating frequency are substantially 180 degrees out of phase.

Optionally, the gating unit is arranged to expose the imaging device for a predetermined proportion of a cycle time of the modulated intensity illumination.

Optionally, the predetermined proportion is associated with a 50% duty cycle of the first frequency.

Optionally, the modulator comprises at least one first photoelastic modulator.

Optionally, the first frequency is a resonant frequency of the first photoelastic modulator.

Optionally, the modulator further comprises a second photoelastic modulator arranged to modulate illumination at second frequency, the second frequency being a resonant frequency of the second photoelastic modulator.

Optionally, the modulator further comprises a linear polariser.

Optionally, the imaging device is a photo detector array.

Optionally, the processor is operable to determine the polarisation parameters of the received illumination by extracting from the selectively measured intensity of the modulated intensity illumination, one or more coefficients of a complex waveform associated with the modulated intensity illumination.

In accordance with a third aspect of the invention, there is provided a module for use in a polarisation measuring device. The module comprises a modulator operable to modulate a polarisation state of illumination received from a target object and to generate modulated intensity illumination; a detector and a gating unit, said gating unit operable to periodically gate an exposure of an imaging device of the detector to the modulated intensity illumination at a first gating frequency, thereby enabling the detector to selectively measure an intensity of the modulated intensity illumination, and a processor operable to determine, from the selective measurement of the intensity of the modulated intensity illumination, polarisation parameters of the received illumination and to generate image data corresponding to the target object with a plurality of the polarisation parameters. The modulator modulates the received illumination in accordance with a first frequency and the first gating frequency is associated with and synchronised with at least the first frequency.

In accordance with a fourth aspect of the invention there is provided a method for measuring polarisation of electromagnetic illumination. The method comprises: modulating a polarisation state of illumination received from a target object to generate modulated intensity illumination; selectively measuring an intensity of the modulated intensity illumination, and responsive to the measured intensity, determining one or more polarisation parameters of the received illumination. The illumination from the target object is modulated in accordance with a first frequency and the intensity of the modulated intensity illumination is selectively measured at a measurement frequency associated with at least the first frequency.

In accordance with a fifth aspect of the invention, there is provided an apparatus for measuring polarisation of electromagnetic illumination. The apparatus comprises: a modulator operable to modulate a polarisation state of illumination received from a target object and to generate modulated intensity illumination; a detector operable to selectively measure an intensity of the modulated intensity illumination, and a processing unit operable to determine, from the selective measurement of the intensity of the modulated intensity illumination, one or more polarisation parameters of the received illumination. The modulator modulates the received illumination in accordance with a first frequency and the detector selectively measures the modulated intensity illumination at a measurement frequency associated with at least the first frequency.

Various further aspects and features of the invention are defined in the claims.

BRIEF DESCRIPTION OF FIGURES

Certain embodiments of the present invention will now be described hereinafter, by way of example only, with reference to the accompanying drawings in which.

In the drawings like reference numerals refer to like parts.

DETAILED DESCRIPTION

The Polarisation state of light is typically analysed in terms of the components of a Stokes vector $\vec{S}$. The Stokes vector is a vector that represents the polarisation state of light in terms of four Stokes parameters, i.e. I, Q, U and V:

$$\vec{S} = \begin{bmatrix} I \\ Q \\ U \\ V \end{bmatrix} \quad [1]$$

I is the total intensity of the light, while Q, U and V represent differences in intensities of orthogonal polarisation states. More specifically, Q is the difference between linear polarisation states with the plane of polarisation orientated at 0° and 90° to a designated laboratory x-axis. U is the difference between polarisation states with the plane of polarisation orientated at 45° and −45° to the laboratory x-axis. V is the difference between left- and right-handed circularly polarised states.

It is difficult to directly measure $\vec{S}$, however, the intensity of light can be readily measured using detectors including imaging devices such as photo detectors. Accordingly, many polarimeters work by detecting the intensity of light that has passed through an optical assembly with known polarising properties. The intensity of the detected light once it has passed through the optical assembly allows information about the polarisation state of the light to be calculated in accordance with the theory detailed below.

The effect of an optical element or combined effect of an arrangement of several elements on the Stokes vector of light can be described by a 4×4 matrix, known as a Mueller matrix:

$$M = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix} \quad [2]$$

Input light with a Stokes vector $\vec{S}$ passing through an optical assembly with an effective Mueller matrix M, produces output light with a Stokes vector $\vec{S}_o$, given by:

$$\vec{S}_o = M \cdot \vec{S} \quad [3]$$

It can be shown that a light ray after transmission through the optical assembly, now having the Stokes vector $\vec{S}_o$, has an intensity given by:

$$I_o = m_{11}I + m_{12}Q + m_{13}U + m_{14}V \quad [4]$$

Measuring $I_o$ could supply all of the unknown Stokes parameters that comprise the input vector, $\vec{S}$, provided that the relevant Mueller matrix elements of the optical assembly are known for at least four different optical settings.

In the following examples, for simplicity, the term "light" has been used. However, it will be understood that this term refers to all electromagnetic illumination (i.e. electromagnetic radiation/rays) suitable for measurement by polarimeters and not simply electromagnetic radiation of one specific range of wavelengths (e.g. visible light).

Polarimeter with Gating Unit

Figure 1:
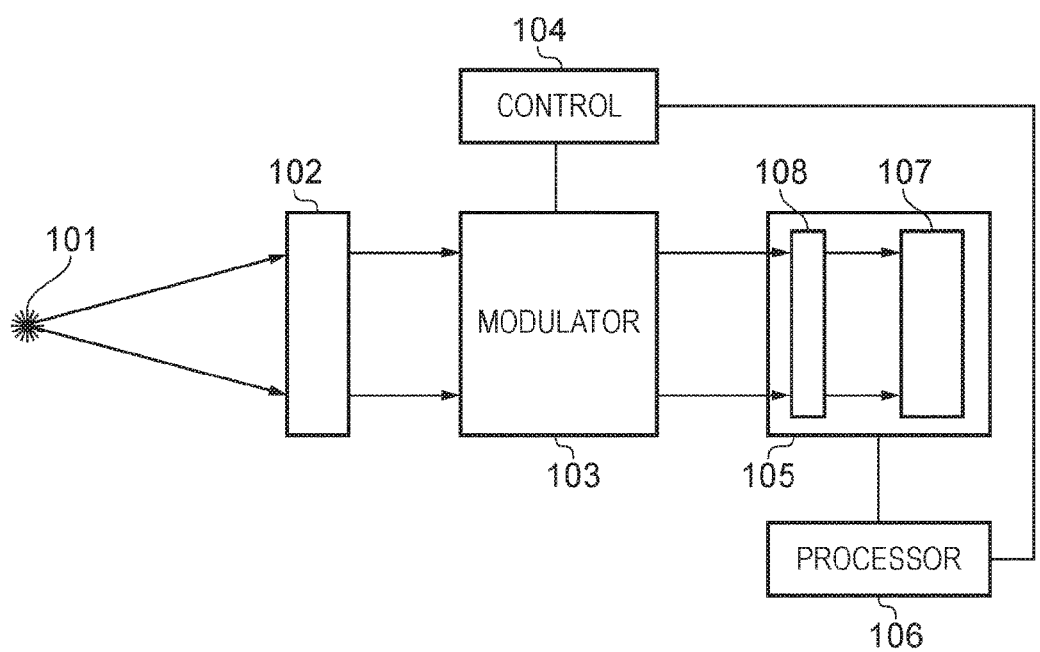
FIG. 1 provides a simplified schematic drawing of polarimeter apparatus arranged in accordance with a first example of the invention.

FIG. 1 provides a simplified schematic drawing of polarimeter apparatus arranged in accordance with a first example.

Light received from a target object such as a sample 101 is incident on an input optical element 102 of the apparatus. The light is directed by the input optical element 102 into a polarisation modulator 103. In some examples a single modulator is used in the modulator 103 in which case a single modulation frequency is used at any one time. In other examples, multiple modulator units may be used in the modulator 103 and therefore multiple modulator frequencies can be used at the same time. Accordingly, the modulator 103 is arranged to modulate the polarisation state of the light in accordance with one or more modulation frequencies.

The modulator 103 is connected to a modulator controller 104 which controls the modulator 103 and modulation frequencies applied to the received light.

As is known, by modulating the polarisation state of the light by a polarising modulator, the intensity of the output light can be correspondingly modulated. Typically, this is achieved by including in the modulator an optical element such as a linear polariser or circular/elliptical polariser that the light passes through before exiting the modulator 103. Thus, the modulator 103 outputs modulated intensity light. The modulated intensity light is light with an intensity that periodically varies in accordance with the optical change imparted by the modulator and at the modulation frequency or frequencies. The changes in intensity vary over time in accordance with a complex waveform. Generally, as is known, this waveform can be analysed to determine information about the polarisation parameters of the light received into the polarimeter.

In some examples, and as will be explained in more detail, the amplitude of the components of this complex waveform (i.e. its coefficients) can be used to determine the polarisation parameters of the received light. Further, the fundamental and harmonic frequencies of these components are related to the modulation frequency or frequencies of the modulator 103.

The detector 105 is arranged to selectively measure (i.e. sample) the intensity of the modulated intensity light at one or more frequencies associated with the one or more modulation frequencies. The detector 105 is arranged to output data corresponding to the selectively measured intensity of the modulated intensity light to a processor 106. In some examples the processor 106 is arranged to determine from this data the amplitude of the components of the complex waveform described above and thus calculate the polarisation parameters (such as the Stokes parameters) of the received light.

Aptly, the detector 105 includes an imaging device provided by a photo detector arrangement. The photo detector arrangement is used to measure the intensity of the modulated intensity light. In imaging polarimeters in which a two dimensional image of the sample is sought, the photo detector arrangement is typically provided by a two-dimensional photo detector array 107. Each pixel of the photo detector array 107 acts as an individual integrator for which polarisation parameters are determined. During operation, the photo detector array 107 is exposed to the modulated intensity illumination over an integration period and then outputs a frame of pixel data. The frame of pixel data comprises data values, each of which correspond to an intensity of light incident on a specific pixel during an exposure period.

Aptly, the processor 106 is arranged to process one or more frames of pixel data to calculate polarisation parameters of light received from different parts of the target object (i.e. sample) and then output this as image data. The image data can conveniently be in the form of an image file (e.g. JPEG, Bitmap etc.) corresponding to a representation of the sample 101, with a combination of different colours, and/or shading, and/or patterns etc., indicating different polarisation parameters. However, the processor 106 may generate image data that represents the polarisation parameters in other more abstract forms such as in the form of one or more histograms or other graphical representation. In general, any suitable form of image data can be used that represents the polarisation parameters of light from the sample with an indication of which parts of the sample (i.e. spatial resolution) correspond to which polarisation parameters. In some cases this could be in the form of a text file with a number of data values indicating a spatial position and corresponding polarisation parameter or parameters.

The integration frequency/frame rate of most two-dimensional photo detector arrays (i.e. the frequency at which the photo detector array samples incident light) is much lower than the modulation frequencies applied by the modulator 103.

Advantageously, a gating unit 108 is provided. The gating unit 108 is arranged to selectively expose (i.e. periodically gate) the photo detector array 107 to the output light from the modulator 103 in correspondence with the modulation frequencies. That is, during the capturing of a frame of pixel data from the photo-detector array 107, the gating unit 108 is arranged to selectively expose the photo detector array in accordance with a gating frequency (otherwise referred to as a measurement frequency) that is associated with one of the modulation frequencies. This enables the detector 105 to selectively measure an intensity of the modulated intensity light.

The gating frequency is associated with one of the modulation frequencies in the sense that it is substantially the same as or substantially the same as an integer multiple of the modulation frequency. The gating frequency and the modulation frequency with which it is associated are also synchronised, i.e. there is substantially a constant phase difference between the two frequencies. Thus, the gating unit 108 operates by periodically gating an exposure of the imaging device to the modulated intensity light at gating frequencies associated with and synchronised with at least one of the modulation frequencies.

The gating unit is controlled by the processor 106 which is also connected to the modulator controller 104. This arrangement allows the processor 106 to control the gating frequencies and modulation frequencies so that, during operation, the gating frequencies and the modulation frequencies are associated with each other as described above and also synchronised.

Dual-Modulator Polarimeter Using Gated Image Intensifier

Figure 2:
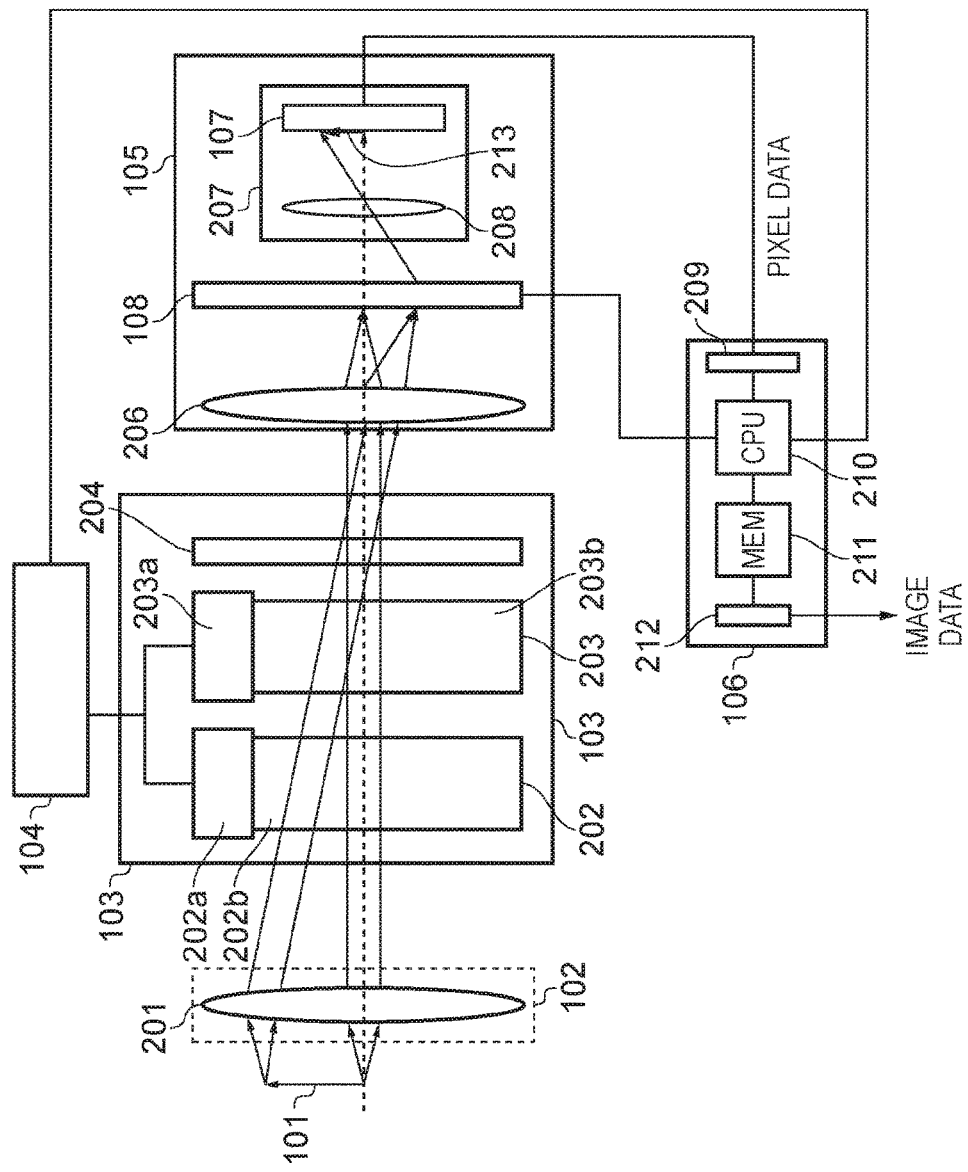
FIG. 2 provides a schematic diagram showing a dual-modulator polarimeter implementation of an example of the invention employing a gated image intensifier.

FIG. 2 provides a schematic diagram showing an example of a dual-modulator polarimeter implementation of the apparatus shown in FIG. 1. As noted above, corresponding parts are indicated with corresponding reference numerals.

In dual-modulator polarimeters, the polarising modulator is provided by two optical phase modulators and a linear polariser. The polarisation coordinate systems of the two modulators are rotated with respect to each other such that their modulated axes make different angles with the x-axis of a designated laboratory coordinate system. Light rays transmitted through such a polarimeter encounter the first phase modulator with its coordinate system (the modulated axis) rotated through an angle α relative to the laboratory x-axis (where the z-axis is along the optical axis of polarimeter). The light rays experience a phase retardation of $\delta_1$ as they pass through the first phase modulator. The light rays then encounter the second phase modulator with its coordinate system rotated through an angle β relative to the laboratory x-axis. The light rays experience a phase retardation of $\delta_2$ as they transmit through the second phase modulator. The light rays then encounter the linear polariser with its transmission axis rotated through an angle γ relative to the laboratory x-axis. As $\delta_1$ and $\delta_2$ are modulated, the Stokes parameters of the light incident upon the analyser are altered, affecting the amount of light that can pass through it. As the effect of the phase modulators on the Stokes vector of the input light is known, by using a photo detector array as an integrator to measure the intensity of the transmitted light, it is possible to calculate the Stokes parameters of the light incident on the first phase modulator.

Referring to FIG. 2, the input optical element 102 includes an infinity corrected optical element provided by an infinity corrected lens 201. The infinity corrected lens 201 is arranged such that light incident on each pixel of the photo detector array 107 is from a set of parallel optical paths through the modulator 103.

The modulator 103 includes a first photoelastic modulator (PEM) 202 and a second PEM 203. The modulator 103 further includes a linear polariser 204. The first and second PEMs 202, 203 each include a transducer 202a, 203a such as a piezoelectric transducer and a resonant bar 202b, 203b. The resonant bar 202b, 203b is made from a material such as fused silica the polarising properties of which change as the resonant bar is stressed and strained by the transducer 202a, 203a.

When controlled by the control signal from the modulator controller 104, the transducers 202a, 203a vibrate at a resonant frequency of their respective resonant bars 202b, 203b. The first PEM 202 resonates at a first frequency $f_{PEM1}$ and the second PEM 203 resonates at a second frequency $f_{PEM2}$.

The polarisation parameters of the light are modulated first by the first PEM 202 and then modulated again by the second PEM 203. As explained above, different phases of the received light passing through the PEMs 202, 203 experience different amounts of phase retardation. Once light that has passed through the first and second PEMS 202, 203 is passed through the linear polariser 204, light of modulated intensity is produced.

The detector 105 includes focusing optics 206 that focus the modulated intensity light from the modulator 103 on the gating unit 108. The detector 105 further includes an imaging device 207 including focusing optics 208 that focus light passed by the gating unit 108 onto the photo detector array 107.

In some examples, a band-pass filter/monochromator can be placed at the entrance to the detector 105, to select a single wavelength for analysis.

In the illustrated example, the gating unit 108 is a gated image intensifier which when active intensifies (i.e. amplifies the brightness of) the light from the modulator 103. Accordingly, an image 213 of the sample 101 incident on the photo detector array 107 is amplified. The gated image intensifier is also arranged such when it is not active, the amount of light transmitted to the photo detector array 107 is at a negligible level, and/or pixels of the photo detector array are calibrated such as to collect no charge from light levels passed by the image intensifier when it is not active. In other words, the photo detector array 107 does not detect the image 213.

The photo detector array 107 is connected to a data interface 209 of the processor 106. Pixel data from the data interface 209 is input to a central processor unit (CPU) 210 of the processor 106. The CPU 210 processes the pixel data as described in more detail below to generate polarisation parameter data which is stored in a memory 211. The memory 211 can output this polarisation parameter data via an input/output interface 212 as image data in any suitable form as described above.

As explained above, light exiting the modulator 103 is of time-varying intensity and more particularly time-varying in accordance with a complex waveform. Properties of this complex waveform are related to the polarisation parameters of the received light.

It can be shown that a light ray having been transmitted through the modulator has a time varying intensity given by the following complex waveform:

$$I_0(t) = m_{11}I + m_{12}(t)Q + m_{13}(t)U + m_{14}(t)V \quad [5]$$

Where I, Q, U and V are the stokes parameters of the light ray and $m_{11}$, $m_{12}$, $m_{13}$, and $m_{14}$ are coefficients of the 4×4 Mueller matrix of the optical system through which the light is transmitted.

Further, it can be shown that the dc component of the waveform $I_0(t)$ is proportional to I, Q and U and that amplitudes of the frequencies that constitute the ac component of the waveform $I_0(t)$ are proportional to the Stokes parameters.

More specifically, the dc component of $I_0(t)$, $S_{dc}$, and the following complex components of $I_0(t)$, $S_{f1}$, $S_{f2}$; and $S_{f3}$, are related to the Stokes parameters as follows:

$$S_{dc} = g_1 I + g_2 Q + g_3 U \quad [6]$$

$$S_{f1} = g_4 Q + g_5 U \quad [7]$$

$$S_{f2} = g_6 Q + g_7 U \quad [8]$$

$$S_{f3} = g_8 V \quad [9]$$

Where $g_1$ to $g_8$ are coefficients of the following matrix:

$$\begin{bmatrix} S_{dc} \\ S_{f1} \\ S_{f2} \\ S_{f3} \end{bmatrix} = \begin{bmatrix} g_1 & g_2 & g_3 & 0 \\ 0 & g_4 & g_5 & 0 \\ 0 & g_6 & g_7 & 0 \\ 0 & 0 & 0 & g_8 \end{bmatrix} \begin{bmatrix} I \\ Q \\ U \\ V \end{bmatrix} = G \begin{bmatrix} I \\ Q \\ U \\ V \end{bmatrix} \quad [10]$$

This matrix corresponds to a 'G' matrix for dual-modulator type arrangements as illustrated, for example, in FIG. 2.

This matrix can be inverted to solve for the Stokes Parameters:

$$\begin{bmatrix} I \\ Q \\ U \\ V \end{bmatrix} = \begin{bmatrix} k_1 & k_2 & k_3 & 0 \\ 0 & k_4 & k_5 & 0 \\ 0 & k_6 & k_7 & 0 \\ 0 & 0 & 0 & k_8 \end{bmatrix} \begin{bmatrix} S_{dc} \\ S_{f1} \\ S_{f2} \\ S_{f3} \end{bmatrix} = K \begin{bmatrix} S_{dc} \\ S_{f1} \\ S_{f2} \\ S_{f3} \end{bmatrix} \quad [11]$$

The non-zero elements of the matrix K, i.e. $k_1$ to $k_8$, are determined by the specific optical parameters of the system. As described previously, the elements of the K matrix are dependent on the optical properties (e.g. polarising effects) associated with a specific optical path through the apparatus. In its most general form, all elements of K can be of non-zero value, the calibration procedure would still be operational, provided more non-equivalent data points are used. In implementations such as those explained with reference to FIGS. 1 and 2 in which each pixel of a photo detector array is used as an integrator, a K matrix for each pixel must be determined. However, using conventional optics, each pixel would receive light from multiple divergent optical paths making suitable calibration very difficult.

Figure 3:
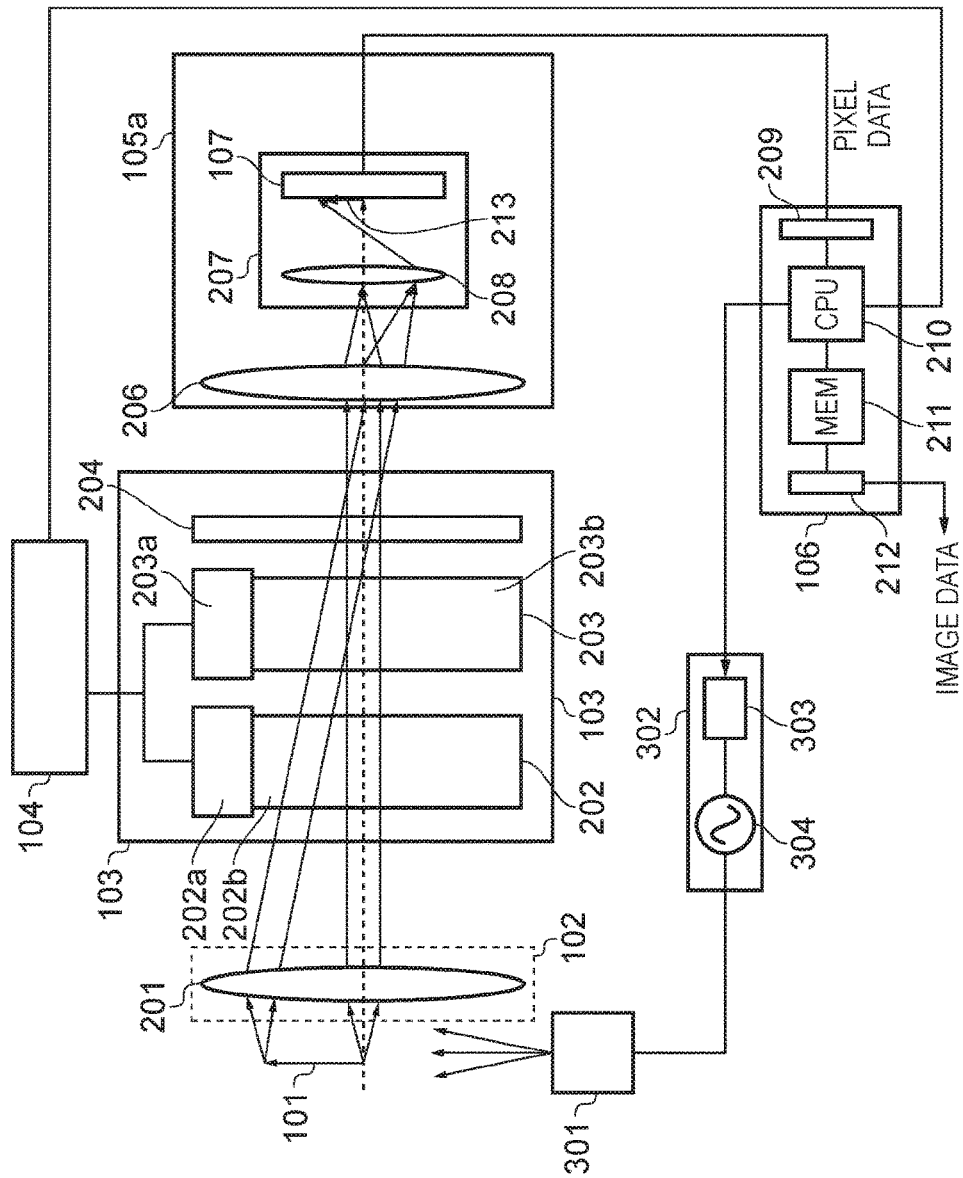
FIG. 3 provides a schematic diagram showing a dual-modulator polarimeter implementation of an example of the invention employing a gated illumination unit.

As can be understood with reference to the optical paths shown in FIGS. 2 and 3, the provision of the infinity corrected lens 201 means that each pixel of the detector array is associated with a single set of parallel optical paths through the apparatus which experience corresponding retardance. The provision of the infinity corrected lens 201 therefore enables a K matrix to be determined on a pixel by pixel basis. Examples of such calibration procedures are described in more detail below.

For the modulator 103 shown in FIG. 2, it can be shown that with reference to equations [6], [7], [8] and [9], that $f1 = 2f_{pem1}$; $f2 = 2f_{pem2}$; and $f3 = f_{pem2}$. Thus $S_{f1} = S_{2fPEM1}$; $S_{f2} = S_{2fPEM2}$; and $S_{f3} = S_{fPEM2}$.

It will be understood therefore that by sampling the intensity of the modulated light (i.e. $I_0(t)$) at $2f_{PEM1}$ (a first gating frequency), $2f_{PEM2}$ (a second gating frequency), and $f_{PEM2}$ (a third gating frequency), and by taking a measurement of the dc component of $I_0(t)$, providing the values of $k_1$ to $k_8$ are known, the Stokes parameters I, Q, U and V can be determined for the light from the sample 101 at each of the pixels of the photo detector array 107.

Therefore, to determine the Stokes parameters, amplitudes of each complex component, $S_{f1}$, $S_{f2}$, $S_{f3}$, of $I_0(t)$, must be determined. In general, any suitable lock-in signal recovery technique can be employed to achieve this.

In one example, to determine the amplitude of $S_{f1}$, during a first exposure period the gated image intensifier 108 operates at the first gating frequency of $2f_{pem1}$ and the photo detector array 107 captures a first frame of pixel data which is received by the CPU 210. That is, the image intensifier periodically intensifies the image 213 incident on the photo detector array 107 at the first gating frequency. The pixel data comprises an integration value for each pixel which corresponds to the total illumination at that pixel during the first exposure period. The phase of the operation of the gated image intensifier 108 is such that the intensity of $I_0(t)$ is sampled during the first half of each modulation period of $I_0(t)$.

The CPU 210 divides the integration value read from each pixel by the number of modulation periods in an exposure period to give an average value of the intensity of the light during an exposure period. This provides a first "frame" of integration values.

During a second exposure period, the same process is performed and a second frame of pixel data is captured. This is captured in the same way as for the first frame, except that the the operation of the gated image intensifier 108 is changed so that the intensity of $I_0(t)$ is sampled during the second half of each modulation period of $I_0(t)$. This process provides a second frame of integration values.

The CPU 210 subtracts the integration values from the first frame of integration values data from the integration values from the second frame of integration values to produce a set of data values, Sig1.

This process is then repeated again and third and fourth frames of pixel data are captured and third and fourth frames of integration values are generated. This process corresponds to that just described in that the gated image intensifier 108 is arranged to operate at the same gating frequency, however its phase is shifted by $\pi/2$. The CPU 210 then subtracts the integration values from the third frame of integration values from the integration values from the fourth frame of integration values to produce a second set of data values, Sig2.

It can be shown that the amplitude of $S_{f1} = \sqrt{Sig1^2 + Sig2^2}$

On this basis, the CPU 210 can determine the amplitude of $S_{f1}$.

The same process, but with the gated image intensifier 108 operating at the relevant gating frequency, is used to determine the amplitude for $S_{f2}$ and $S_{f3}$.

As will be understood, using the process described above, four frames of pixel data are captured to determine the amplitude of each complex of component of $I_0(t)$. Therefore a total of twelve frames of pixel data are captured in order to determine the amplitudes of $S_{f1}$, $S_{f2}$ and $S_{f3}$.

The dc component, $S_{dc}$, can be determined by summing either the first frame and second frame of integration values, or by summing the second and third frame of integration values.

Once the amplitude of $S_{f1}$, $S_{f2}$ and $S_{f3}$, and the dc value $S_{dc}$ for each pixel of the photo detector array 107 have been calculated, the CPU 210 is arranged to use matrix [10] to determine values for I, Q, U and V for all of pixels of the photo detector array 107 and generate and output image data as described above.

As will be understood, generally, the function of the image intensifier is to provide the effect of a shutter disposed between the modulator and the detector, said shutter operating at the relevant gating frequencies. It will be understood that any suitable unit that provides this general functionality could be used.

Dual-Modulator Polarimeter Using Gated Illumination of the Object

FIG. 3 provides a schematic diagram of an implementation of another example of a polarimeter apparatus. Component parts of the polarimeter apparatus shown in FIG. 3 that correspond with components parts of the polarimeter apparatus shown in FIG. 2 are provided with corresponding reference numerals.

The polarimeter apparatus shown in FIG. 3 corresponds with that shown in FIG. 2 except that the gating unit is not provided by an image intensifier. Instead the gating unit is a gated illumination unit 301. A modified detector unit 105a is provided that does not include an image intensifier. The gated illumination unit 301 is typically provided by a suitable LED or laser and is controlled by an illumination control unit 302. The laser or diode can be monochromatic thereby overcoming a requirement for a band-pass filter before the detector if only one bandwidth is to be analysed In operation, rather than selectively exposing the photo detector array 107 using a gating unit disposed between the modulator and the detector, instead the photo detector array 107 is selectively exposed using a gated illumination unit 301 that selectively (i.e. periodically) illuminates the sample 101 at the various gating frequencies. Typically, the sample 101 is placed under the illumination of the light from the gated illumination unit 301. Typically, the surrounding environment is lit to remain at a constant lighting level during measurement and at a lighting level to avoid saturating the photo detector array 107.

The photo detector array 107 is selectively exposed to the image 213 in an equivalent manner as when the image intensifier is used. That is, during each exposure period, each pixel of the photo detector array 107 is exposed to the modulated light $I_0(t)$ sampled at the relevant gating frequency. The process for generating the polarisation parameters are otherwise the same as that for example shown in FIG. 2.

The illumination control unit 302 includes an illumination processing unit 303 and a function generator 304. The function generator 304 provides a control signal which is sent to the gated illumination unit 301 and controls the timing of illumination.

In accordance with this example, there is no need to provide a gating mechanism between the modulator and the detector. This is generally a less complex arrangement than using an image intensifier because there are fewer intervening components between the modulator and photo detector array, which is simpler mechanically and potentially leads to fewer sources of error. However, the image intensifier arrangement may be more suitable for applications in which the target object is likely to be changed or damaged due to the illuminating light, such as vulnerable biological samples.

Calibration

To calibrate the examples of the polarimeter apparatus described with reference to FIGS. 2 and 3, calibration data, corresponding to a K matrix (i.e. matrix [11]) is determined for each pixel. The calibration data accounts for specific optical effects associated with optical paths within the polarimeter apparatus. This includes polarising effects introduced by the input optical element and any misalignment of the optics such as the modulator and other optical components.

As explained above, by providing the infinity corrected lens, light incident on each pixel of the photo detector is from a specific set of parallel optical path within the apparatus. This means that a calibration procedure, corresponding for example to the calibration procedures discussed in Guan et al, Applied Optics, 2010 and Cook, 'A study of focused ion beam patterned thin magnetic films with soft x-ray and magneto-optical microscopy', PhD thesis, Salford (2010), can be performed by generating calibration data on a pixel-by-pixel basis.

Figure 4:
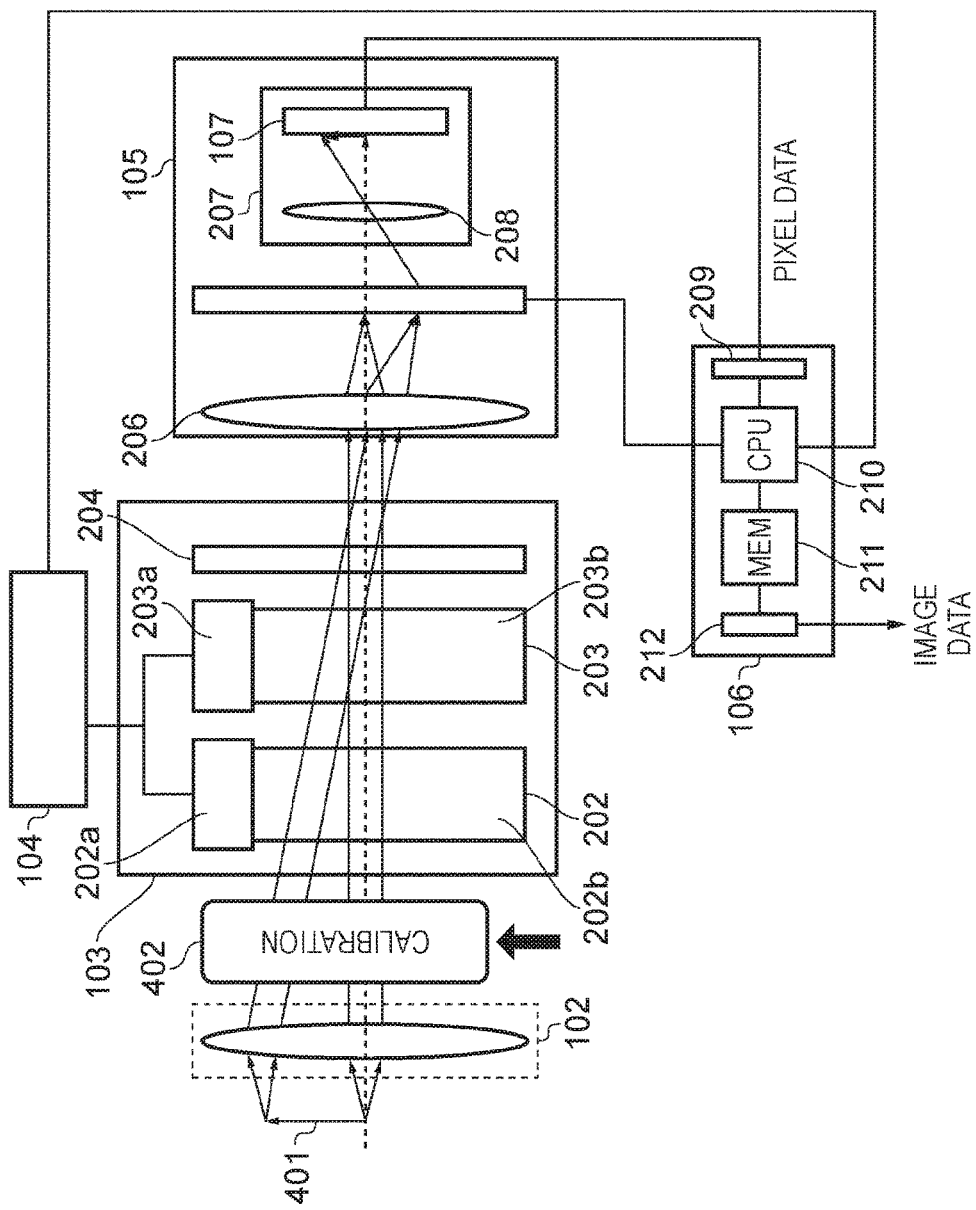
FIG. 4 provides a schematic diagram illustrating a calibration technique in accordance with an example of the invention.

Such a calibration procedure is illustrated in more detail in FIG. 4.

FIG. 4 provides schematic diagram of a polarimeter apparatus corresponding to that shown in FIG. 2 except that the sample is a patterned target object, i.e. a patterned test sample 401 with known optical properties. In some examples this could be a continuous semi-transparent magnetic film with known magneto optical characteristics. The film may typically include an overlaid non-transparent pattern so that it can be imaged by the system. Further, a calibration optical element 602 is removably inserted between the input optical element 102 and the modulator 103.

It will be understood that although the calibration technique is illustrated with reference to the example of FIG. 2 (in which the gating unit is positioned between the modulator and the photo detector array), the technique can also be used with the technique illustrated in FIG. 3 (in which the gaiting unit is provided by the gated illumination unit).

The calibration optical element 402 typically comprises a linear polariser and a rotatable retardation plate of, for example, λ/4 retardation. In some examples, these are separable units and the linear polariser is inserted first, and calibration measurements taken, followed by the wave plate and then further calibration measurements taken.

During the calibration process, calibration data corresponding to the K matrix for the optical path associated with each pixel position on the photo detector array is determined by and then used by the CPU 210 when calculating the polarisation parameters. This can be performed generally in accordance with the techniques described in Cook, and in particular chapter 4, section 4.3.3 of Cook. Once the calibration process is complete and the CPU 210 has generated calibration data corresponding to the K matrix for the optical path associated with each pixel position on the photo detector array, the patterned test sample 401 and the calibration optical element 402 are removed.

In some examples, the photo detector array may include many millions of pixels. In such cases it may be too time consuming and/or impractical from a processing perspective for the CPU 210 to determine a K matrix for every single pixel. The K matrix values typically vary smoothly across the pixels of the photo-detector array. Accordingly, in some examples, the K matrices for a sub set of the pixels are determined by the CPU 210 and calibration data (i.e. K matrices) for the remaining pixels are determined by the CPU 210 performing an interpolation algorithm.

Multichannel Detector

Figure 5:
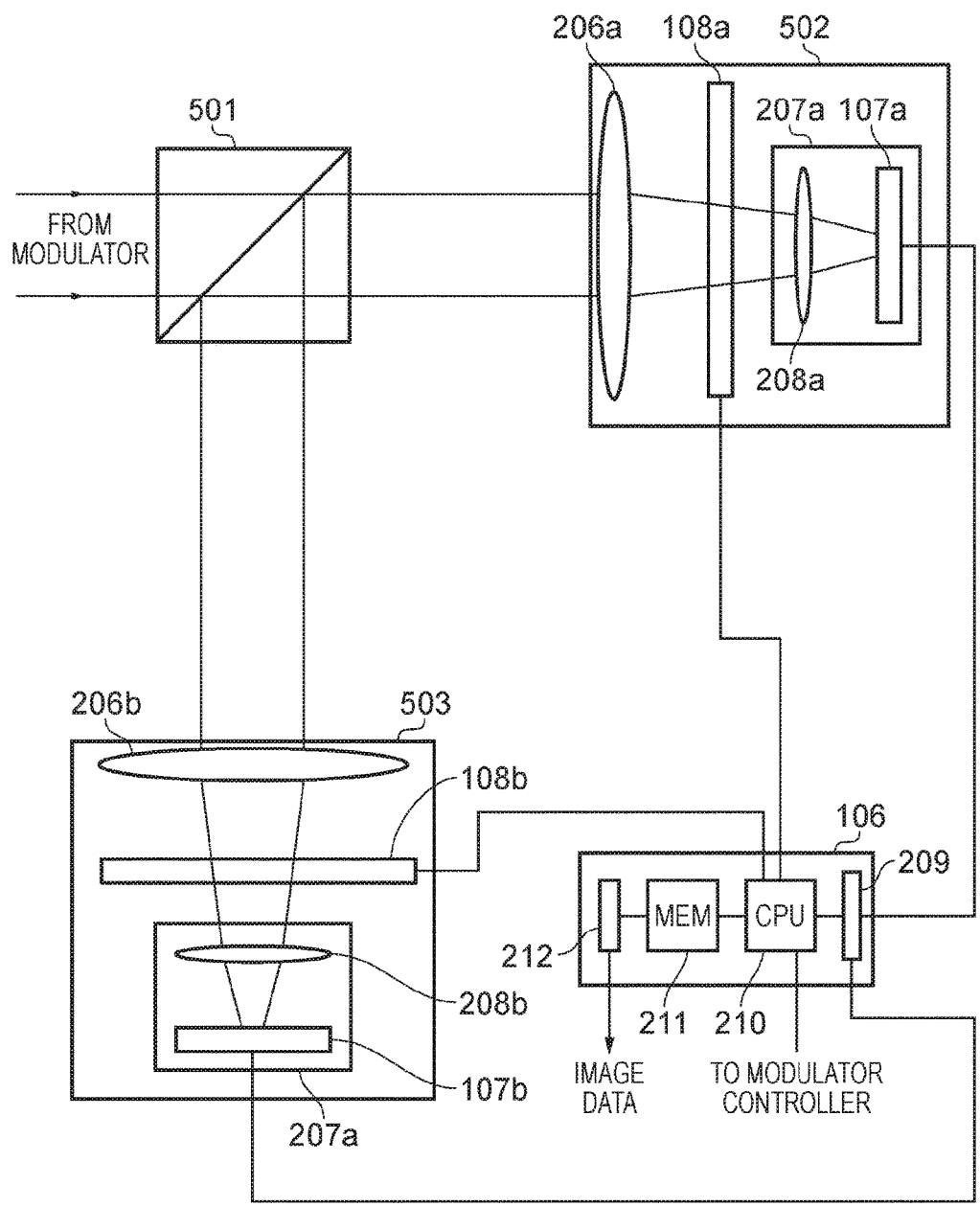
FIG. 5 provides a schematic diagram of a multichannel implementation of a detector for a polarimeter in accordance with an example of the invention.

FIG. 5 provides a schematic diagram of an alternative implementation of a detector facilitated by examples of the invention.

In the examples shown in FIG. 2 and FIG. 3, the detector typically captures several frames of pixel data to recover enough information to allow the Stokes parameters to be calculated for each pixel of the photo detector array 107. Accordingly, the same number of exposure periods must elapse before the Stokes parameters can be calculated by the processor 106.

In some examples, a beam splitter can be positioned after the modulator to produce a number of further beams of the modulated intensity light. Each beam of modulated intensity light (i.e. channel) can be directed into a separate detector unit allowing multiple frames of pixel data to be generated at the same time. This allows frames of pixel data to be processed in parallel. For example Sig1 and Sig2 described above can be determined in parallel reducing the time taken to determine the amplitude of the complex components of $I_0(t)$ and thus the Stokes parameters.

In other examples, a first channel can be arranged to demodulate the frequency associated with the first modulator PEM1 and a second channel can be used to demodulate the frequency associated with the second modulator PEM 2.

FIG. 5 shows a multichannel detector implementation in which a beam splitter 501 is positioned after the modulator (the modulator is not shown).

The beam splitter 501 directs two separate, but identical, beams of modulated intensity light to a first detection assembly 502 and a second detection assembly 503.

The first and second detection assemblies 502, 503 each include focusing optics 206a, 206b, a gating unit 108a, 108b, an imaging device 207a, 207b including focusing optics 208a, 208b and a photo detector array 107a, 107b. The function and operation of these components correspond to those of the detector 105 described above with reference to FIG. 2.

The gating unit 108a of the first detection assembly 502 is arranged during operation to expose the photo detector array 107a to the modulated intensity light with a predetermined proportion of a cycle time of $I_0(t)$, for example 50% duty cycle of a period of the gating frequency (i.e. the gating period). This corresponds to a 50% duty cycle of the modulation period.

It will be understood that a 50% duty cycle is merely exemplary. In some examples, a shorter duty cycle can be used, with, for example, multiple samples being taken in each modulation period. This can reduce the required dynamic range of the detector but may require more frames to be captured to determine all the relevant information to determine the Stokes Parameters.

In some examples, the gating unit 108b of the second detection assembly 503 is arranged during operation to expose the photo detector array 107b to the modulated intensity light with a 50% duty cycle of the gating frequency but 180 degrees out of phase from that of the first detection assembly. As discussed above, this enables Sig1 and Sig2 to be determining in parallel. As will be understood, in order to realise implementations in which the gating frequencies are 180 degrees out of phase, it is typically necessary to have a gating unit in each detector.

This arrangement allows two frames of pixel data to be captured during a single exposure period and therefore allows both Sig1 and Sig2 to be calculated from pixel data captured during a single exposure period. This concept is explained in more detail with reference to FIG. 6.

Figure 6:
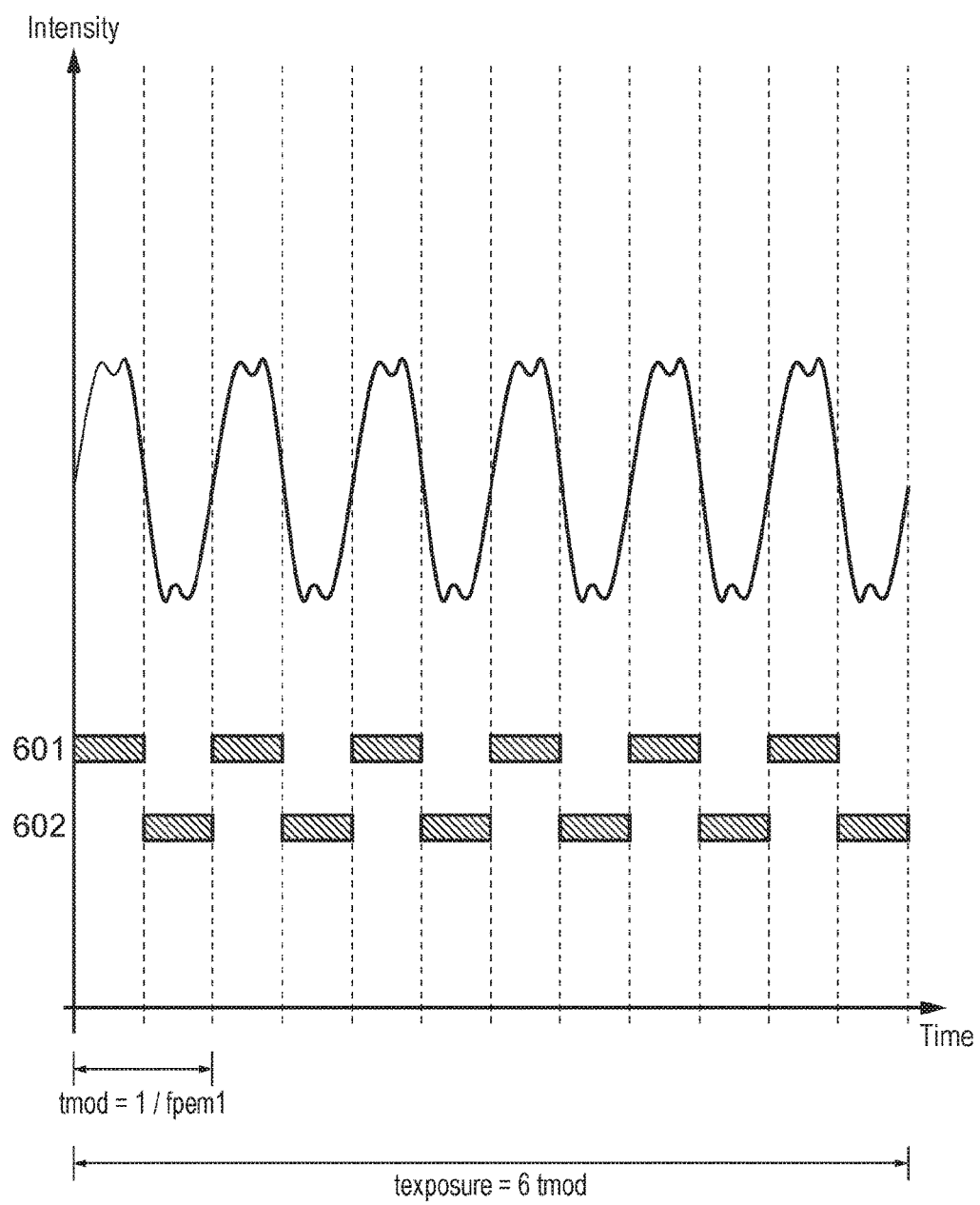
FIG. 6 provides a schematic diagram of the sampling of modulated intensity illumination.

FIG. 6 shows an illustration of the complex waveform $I_0(t)$. The modulation period ($t_{mod}$) corresponds to the period of the modulation frequency of the first modulator $f_{pem1}$. A single exposure period ($t_{exposure}$) typically lasts an integer multiple of the modulation period. In the example shown in FIG. 6, this is six times the modulation period. When the exposure period is complete, each pixel value from the photo detector array is read out.

When the processor 106 calculates the intensity of the modulated intensity light incident on each pixel, the pixel value read out after the exposure period is completed is divided by the number of modulation periods in the exposure period. In this way, an average light intensity for the modulation period is determined and the accuracy of the process is improved.

A first series of blocks 601 indicate times during the exposure period at which the gating unit 108a of the first detection assembly 502 exposes the photo detector array 107a of the first detection assembly 502. A second series of blocks 602 indicate times during the exposure period at which the gating unit 108b of the second detection assembly 403 exposes the photo detector array 107b of the second detection assembly 503. As mentioned above, and as can be seen from FIG. 6, the gating units 108a, 108b of the first and second detection assemblies 502, 503 expose the respective photo detector arrays 107a, 107b to the modulated intensity light with a 50% duty cycle of the gating frequency period except 180 degrees out of phase.

It will be understood that the multi-channel example explained with reference to FIG. 5 can be calibrated using the calibration technique described with reference to FIG. 4 except that the processor 106 will generate a K matrix for pixels from both photo detector arrays. As the beam splitter is positioned after the modulator, only a single calibration optical element and test sample is needed.

The multi-channel implementation shown in FIG. 5 comprises two beams. However, in some examples, the beam splitter may create more beams and more detection channels can be provided.

The polarimeter arrangements and techniques described above can be used in many applications, for example incorporated within microscopes in which the target object may be a small object such as a biological cell; or incorporated within astronomical instruments in which case the target object may be a large object for example a star or galaxy at a great distance from the polarimeter. In other examples, rather than a scientific instrument, the polarimeter may be incorporated in a device with a more general function, such as part of a robotic vision system.

In applications in which the target object is at a great distance from the polarimeter, the light entering the polarimeter may be already substantially parallel. Alternatively, primary focusing optics (e.g. a lens or mirror) may be placed before the polarimeter so that light entering the polarimeter is substantially parallel. In such cases, there may be no requirement for the infinity corrected optical element as the nature of the received light is such that each pixel of the image device will be associated with a single optical path through the polarimeter.

In the example implementations discussed with reference to FIGS. 2 and 3, the polarising modulator is provided by two PEMs and a linear polariser. PEMs provide very low residual birefringence, do not degrade on exposure to UV light, have large apertures and acceptance angles and require very little power to operate. However, it will be understood that any optical element that can impart a modulated polarisation to input light and convert this into light with modulated intensity could be used. Such optical elements include Pockels cells and liquid crystal retarders.

Figure 7A:
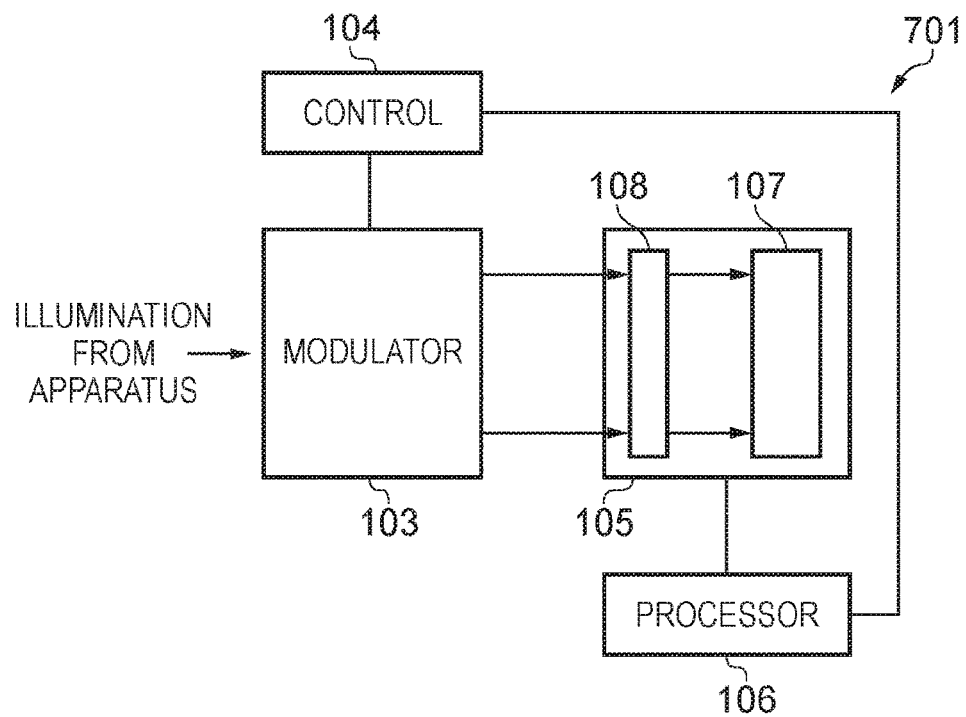
FIGS. 7a and 7b provide a schematic diagrams of modules in accordance with examples of the invention, for incorporation in an apparatus.
Figure 7B:
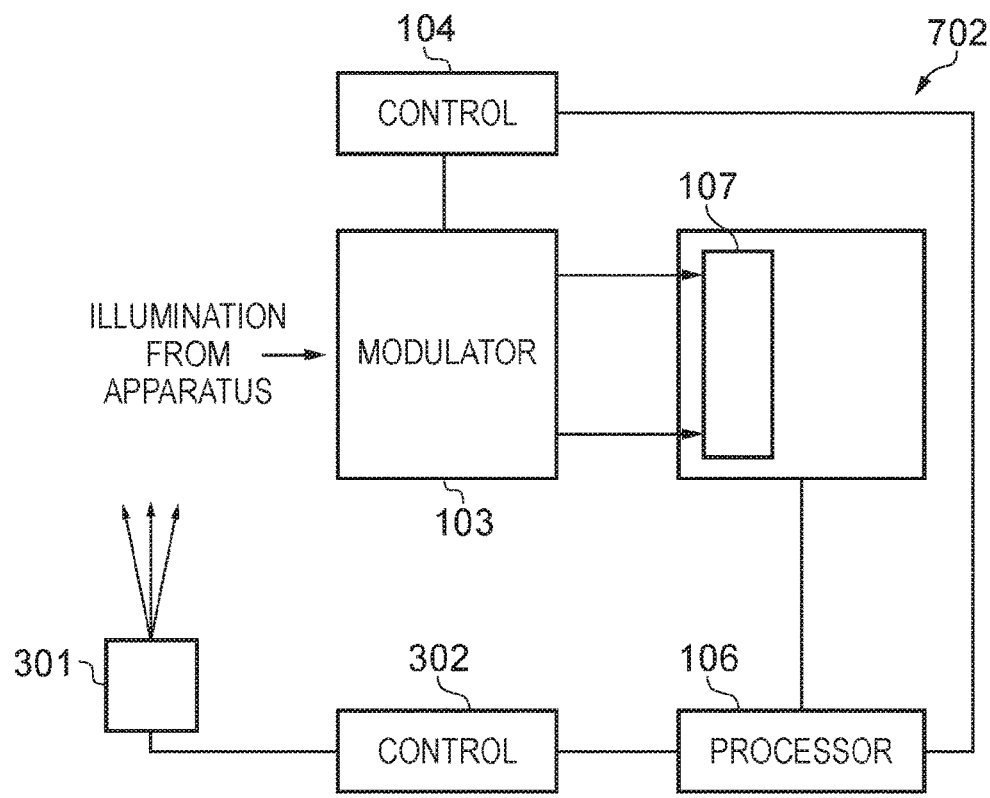

In some examples, a modular unit embodying principles of the invention can be provided which is added to an otherwise conventional device such as a conventional microscope. That is, a module for use in a polarisation measuring device. FIGS. 7a and 7b illustrate this concept.

FIG. 7a provides a simplified schematic diagram of a first modular unit 701 for incorporation in such a conventional device. The modular unit 701 includes component parts corresponding to those described with reference to FIG. 1, namely a modulator 103, a modulator controller 104, a detector 105 comprising a gating unit 108 and a photo detector array, and a processor 106. The first modular unit 701 is fitted to an apparatus, for example a microscope (not shown), such that light from the optics of the microscope enters the modulator. Polarisation parameters of the light are calculated as discussed above.

FIG. 7b provides a schematic diagram of a modular unit 702 the components of which correspond with the modular unit 701 discussed with reference to FIG. 7a, except that the modular unit 702 is provided with a gated illumination unit 301 as the gating unit, rather than an integral gating unit disposed between the modulator and the photo detector array.

In the examples described above, the processor that receives the pixel data (i.e. the data corresponding to the selectively measured intensity of the modulated light), and from this calculates the polarisation parameters, is illustrated as a single processor comprising memory and a CPU and connected to the imaging device of the detector of the polarimeter. However, it will be understood, that in some examples this is simply a logical designation and the function performed by this processor (e.g. receiving pixel data and generating image data) can be performed across a number of interconnected but physically distributed processors.

Further, in the examples described above, various steps have been described in terms of "each" or "all" of the pixels of the photo-detector array. It will be understood that in some examples, only a subset of the pixels of a photo detector array may be used at any one time. For example, in order to control an amount of data in a frame of pixel data, or to reduce an amount of calibration data required, a photo detector array may be arranged to use only a subset of the total number of pixels physically present on a photo detector array.

Further, the imaging device in the examples described above, is generally referred to in terms of a two dimensional photo detector array. However, it will be understood that the principles of the invention can be applied to any suitable imaging device capable of detecting modulated intensity illumination. Some examples may include a single photo detector or a one dimensional "line" of individual photo detectors.

Figure 8:
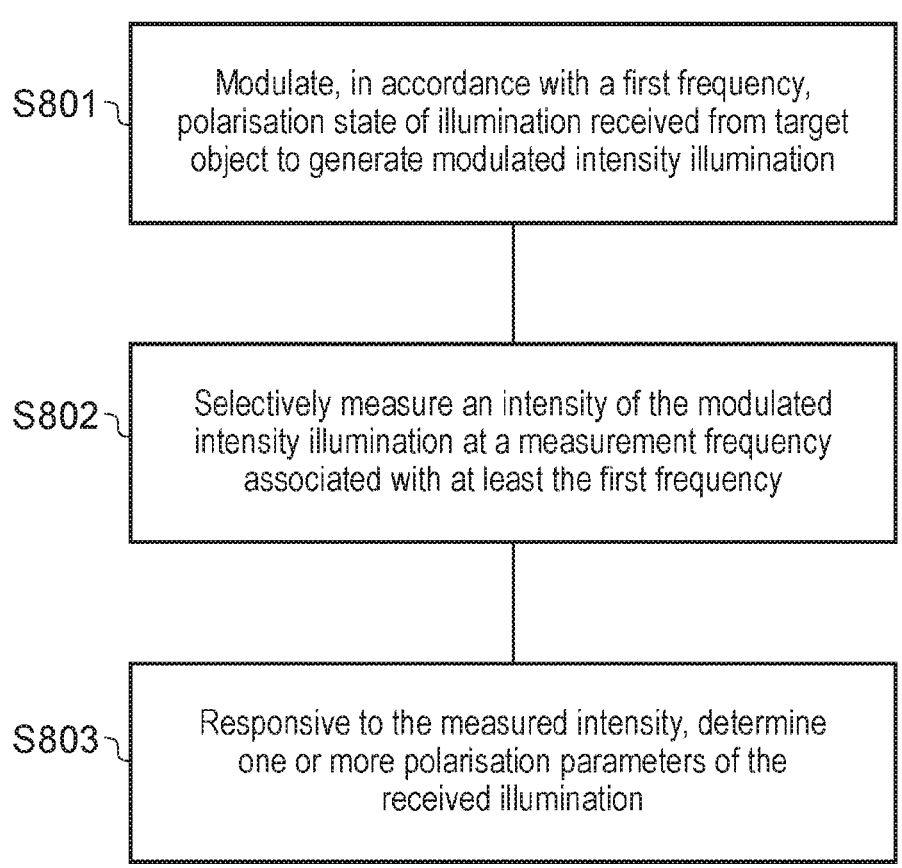
FIG. 8 provides a flow chart in accordance with a method of measuring the polarisation of light in accordance with an example of the invention.

FIG. 8 provides a flow chart in accordance with a method of measuring the polarisation of light in accordance with an example of the invention.

At a first step 801 a polarisation state of illumination received from a target object is modulated in accordance with a first frequency to generate modulated intensity illumination At a second step 802, an intensity of the modulated intensity illumination is measured in accordance with a measurement frequency associated with at least the first frequency.

At a third step S803, responsive to the measured intensity, one or more polarisation parameters of the received illumination are determined.

With reference to Matrix [11], it should be noted that dual PEM arrangements give rise to this specific form of K matrix. In a more general form, all elements of the K matrix can be non-zero. Typically in this case, the minimum number of data points required for the determination of such a matrix increases. For example, 16 non-equivalent data points would be required. In some examples, more points could be used in conjunction with an optimisation procedure.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for measuring polarisation of electromagnetic illumination, comprising:
   passing the illumination through an infinity corrected optical element;
   modulating a polarisation state of illumination received from a target object to generate modulated intensity illumination;
   selectively measuring an intensity of the modulated intensity illumination by periodically gating an exposure of an imaging device to the modulated intensity illumination at a first gating frequency;
   determining calibration data associated with polarising effects of different optical paths taken by the received illumination after being received and before being selectively measured;
   responsive to the measured intensity, determining polarisation parameters of the received illumination in accordance with the determined calibration data; and
   generating image data corresponding to the target object with a plurality of the polarisation parameters,
   wherein the illumination from target object is modulated in accordance with a first frequency and the first gating frequency is associated with and synchronised with at least the first frequency, and
   wherein determining the calibration data comprises passing illumination from a patterned target object of known optical properties through a calibration optical element of known optical properties after being passed through the infinity corrected lens and before being modulated.

2. The method according to claim 1, wherein periodically gating the exposure of the imaging device to the modulated intensity illumination comprises intensifying an image incident at the imaging device at the first gating frequency.

3. The method according to claim 2, wherein the image incident on the imaging device is intensified at the first gating frequency by an image intensifier.

4. The method according to claim 1, wherein periodically gating the exposure of the imaging device to the modulated intensity illumination comprises periodically illuminating the target object at the first gating frequency.

5. The method according to claim 1, wherein selectively measuring the intensity of the modulated intensity illumination comprises periodically measuring the modulated intensity illumination for a predetermined proportion of a cycle time of the modulated intensity illumination.

6. The method according to claim 5, wherein the predetermined proportion is associated with a 50% duty cycle of the first frequency.

7. The method according to claim 1, wherein the polarisation parameters are Stokes parameters.

8. The method according to claim 7, comprising using the one or more coefficients to solve a Mueller matrix to determine the Stokes parameters.

9. An apparatus for measuring polarisation of electromagnetic illumination, comprising:
   an infinity corrected optical element disposed such that illumination passes through the infinity corrected optical element before passing through the modulator;
   a modulator operable to modulate a polarisation state of illumination received from a target object and to generate modulated intensity illumination;
   a detector and a gating unit, said gating unit operable to periodically gate an exposure of an imaging device of the detector to the modulated intensity illumination at a first gating frequency, thereby enabling the detector to selectively measure an intensity of the modulated intensity illumination, and
   a processor operable to:
      determine calibration data associated with polarising effects of different optical paths taken by the received illumination after being received and before being selectively measured; and
      determine, from the selective measurement of the intensity of the modulated intensity illumination in accordance with the determined calibration data polarisation parameters of the received illumination and to generate image data corresponding to the target object with a plurality of the polarisation parameters,
   wherein the modulator modulates the received illumination in accordance with a first frequency and the first gating frequency is associated with and synchronised with at least the first frequency, and
   wherein to determine the calibration data the processor is operable to pass illumination from a patterned target object of known optical properties through a calibration optical element of known optical properties after being passed through the infinity corrected lens and before being modulated.

10. The apparatus according to claim 9, wherein the gating unit is an image intensifier operable to intensify, at the first gating frequency, an image incident at the imaging device.

11. The apparatus according to claim 9, wherein the gating unit is an illumination unit operable to periodically illuminate the target object at the first gating frequency.

12. The apparatus according to claim 9, wherein the processor is operable to determine the polarisation parameters of the received illumination by extracting from the selectively measured intensity of the modulated intensity illumination, one or more coefficients of a complex waveform associated with the modulated intensity illumination.

13. The apparatus according to claim 9, wherein the gating unit is arranged to expose the imaging device for a predetermined proportion of a cycle time of the modulated intensity illumination.

14. The apparatus according to claim 13, wherein the predetermined proportion associated with a 50% duty cycle of the first frequency.

15. A module for use in a polarisation measuring device, comprising:
- an infinity corrected optical element disposed such that illumination passes through the infinity corrected optical element before passing through the modulator;
- a modulator operable to modulate a polarisation state of illumination received from a target object and to generate modulated intensity illumination;
- a detector and a gating unit, said gating unit operable to periodically gate an exposure of an imaging device of the detector to the modulated intensity illumination at a first gating frequency, thereby enabling the detector to selectively measure an intensity of the modulated intensity illumination, and
- a processor operable to:
  - determine calibration data associated with polarising effects of different optical paths taken by the received illumination after being received and before being selectively measured; and
  - determine, from the selective measurement of the intensity of the modulated intensity illumination in accordance with the determined calibration data polarisation parameters of the received illumination and to generate image data corresponding to the target object with a plurality of the polarisation parameters,
- wherein the modulator modulates the received illumination in accordance with a first frequency and the first gating frequency is associated with and synchronised with at least the first frequency, and
- wherein to determine the calibration data the processor is operable to pass illumination from a patterned target object of known optical properties through a calibration optical element of known optical properties after being passed through the infinity corrected lens and before being modulated.

* * * * *

UNITED STATES PATENT AND TRADEMARK OFFICE
CERTIFICATE OF CORRECTION

PATENT NO. : 10,228,287 B2  
APPLICATION NO. : 15/321148  
DATED : March 12, 2019  
INVENTOR(S) : Shen et al.

Page 1 of 1

It is certified that error appears in the above-identified patent and that said Letters Patent is hereby corrected as shown below:

On the Title Page

In item (71), in "Applicant", in Column 1, Line 2, after "Salford", insert --, Greater Manchester--

In the Claims

In Column 19, Line 61, in Claim 1, after "from", insert --the--

In Column 20, Line 49, in Claim 9, after "data", insert --,--

In Column 22, Line 11, in Claim 15, after "data", insert --,--

Signed and Sealed this
Twenty-eighth Day of April, 2020

Andrei Iancu
*Director of the United States Patent and Trademark Office*